United States Patent
Miller et al.

(10) Patent No.: US 8,321,634 B2
(45) Date of Patent: *Nov. 27, 2012

(54) SYSTEM AND METHOD FOR PERFORMING MEMORY OPERATIONS IN A COMPUTING SYSTEM

(75) Inventors: Steven C. Miller, Livermore, CA (US); Martin M. Deneroff, Oakhurst, NJ (US); Curt F. Schimmel, San Ramon, CA (US); Larry Rudolph, Brookline, MA (US); Charles E. Leiserson, Cambridge, MA (US); Bradley C. Kuszmaul, Lexington, MA (US); Krste Asanovic, Cambridge, MA (US)

(73) Assignee: Silicon Graphics International Corp., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/084,280

(22) Filed: Apr. 11, 2011

(65) Prior Publication Data

US 2011/0191545 A1    Aug. 4, 2011

Related U.S. Application Data

(63) Continuation of application No. 12/168,689, filed on Jul. 7, 2008, now Pat. No. 7,925,839, which is a continuation of application No. 10/836,932, filed on Apr. 30, 2004, now Pat. No. 7,398,359.

(60) Provisional application No. 60/467,019, filed on Apr. 30, 2003.

(51) Int. Cl.
    *G06F 12/00* (2006.01)

(52) U.S. Cl. .................................. 711/141; 711/127

(58) Field of Classification Search .................. 711/141, 711/127
    See application file for complete search history.

(56) References Cited

U.S. PATENT DOCUMENTS

| | | | |
|---|---|---|---|
| 4,403,286 A | 9/1983 | Fry et al. | |
| 4,412,303 A | 10/1983 | Barnes et al. | |
| 5,892,962 A | 4/1999 | Cloutier | |
| 5,913,068 A | 6/1999 | Matoba | |
| 6,098,156 A | 8/2000 | Lenk | |
| 6,327,668 B1 | 12/2001 | Williams | |
| 6,823,516 B1 | 11/2004 | Cooper | |
| 6,948,035 B2 * | 9/2005 | Rowlands et al. | 711/141 |

(Continued)

OTHER PUBLICATIONS

Jim Handy, The Cache Memory Book, 1998, Academic Press Limited, Second Edition pp. 124 and 156.

*Primary Examiner* — Hashem Farrokh
(74) *Attorney, Agent, or Firm* — Morgan, Lewis & Bockius LLP

(57) ABSTRACT

A processor may operate in one of a plurality of operating states. In a Normal operating state, the processor is not involved with a memory transaction. Upon receipt of a transaction instruction to access a memory location, the processor transitions to a Transaction operating state. In the Transaction operating state, the processor performs changes to a cache line and data associated with the memory location. While in the Transaction operating state, any changes to the data and the cache line is not visible to other processors in the computing system. These changes become visible upon the processor entering a Commit operating state in response to receipt of a commit instruction. After changes become visible, the processor returns to the Normal operating state. If an abort event occurs prior to receipt of the commit instruction, the processor transitions to an Abort operating state where any changes to the data and cache line are discarded.

22 Claims, 1 Drawing Sheet

U.S. PATENT DOCUMENTS

| | | |
|---|---|---|
| 7,502,917 B2 * | 3/2009 | Arimilli et al. ............... 712/225 |
| 2002/0095554 A1 | 7/2002 | McCrory et al. |
| 2002/0198883 A1 | 12/2002 | Nishizawa et al. |
| 2003/0155423 A1 | 8/2003 | Limelette et al. |
| 2003/0177320 A1 * | 9/2003 | Sah et al. ...................... 711/158 |
| 2004/0010610 A1 | 1/2004 | Cypher |
| 2004/0093467 A1 | 5/2004 | Shen et al. |

* cited by examiner

SYSTEM AND METHOD FOR PERFORMING MEMORY OPERATIONS IN A COMPUTING SYSTEM

CROSS REFERENCE TO RELATED APPLICATIONS

This application is a continuation application of U.S. application Ser. No. 12/168,689 now U.S. Pat. No. 7,925,839 which is a continuation of U.S. application Ser. No. 10/836,932 now U.S. Pat. No. 7,398,359 which claims the benefit of U.S. Provisional Application No. 60/467,019 filed Apr. 30, 2003, all of which are hereby incorporated by reference herein.

TECHNICAL FIELD OF THE INVENTION

The present invention relates in general to computer system processing and more particularly to a system and method for performing memory operations in a computing system.

BACKGROUND OF THE INVENTION

In computer systems, there is a disparity between processor cycle time and memory access time. Since this disparity limits processor utilization, caches have been introduced to solve this problem. Caches, which are based on the principal of locality, provide a small amount of extremely fast memory directly connected to a processor to avoid the delay in accessing the main memory and reduce the bandwidth needed to the main memory. Even though caches significantly improve system performance, a coherency problem occurs as a result of the main memory being updated with new data while the cache contains old data. For shared multi-processor systems, a cache is almost a necessity since access latency to memory is further increased due to contention for the path to the memory. It is not possible for the operating system to ensure coherency since processors need to share data to run parallel programs and processors cannot share a cache due to bandwidth constraints.

Various algorithms and protocols have been developed to handle cache coherency. For example, in a directory based caching structure, a write invalidate scheme allows for a processor to modify the data in its associated cache at a particular time and force the other processors to invalidate that data in their respective caches. When a processor reads the data previously modified by another processor, the modifying processor is then forced to write the modified data back to the main memory. Though such a scheme handles cache coherency in theory, limitations in system performance are still apparent.

SUMMARY OF THE INVENTION

From the foregoing, it may be appreciated by those skilled in the art that a need has arisen for an extended coherency protocol and an ability to track access to memory locations involved in a transaction and processor state information. In accordance with the present invention, there is provided a system and method for performing memory operations in a computing system that substantially eliminates or greatly reduces disadvantages and problems associated with conventional coherency protocols.

According to an embodiment of the present invention, there is provided a system for performing memory operations in a computing system that includes a processor that operates in one of a plurality of operating states. In a Normal operating state, the processor is not involved with a memory transaction. Upon execution of a transaction instruction to access a memory location, the processor transitions to a Transaction operating state. In the Transaction operating state, the processor performs changes to a cache line in a cache memory associated with the memory location to include changing from a MESI coherency protocol to one of a plurality of transactional coherency states associated with the Transaction operating state. While in the Transaction operating state, any changes to the data and the cache line are not visible to other processors in the computing system. These changes become visible upon the processor entering a Commit operating state in response to receipt of a commit instruction. After changes become visible and the cache line is returned to the MESI coherency protocol, the processor returns to the Normal operating state. If an abort event occurs prior to receipt of the commit instruction, the processor transitions to an Abort operating state where any changes to the data and cache line are discarded. Upon discarding the changes, the processor transitions to a Suspended state and awaits receipt of a commit instruction before transitioning to the Normal operating state The present invention provides various technical advantages over conventional coherency protocols. For example, one technical advantage is to treat memory access and operations as transactions. Another technical advantage is to provide a transaction record in the processor to track the state of the processor during memory transactions. Yet another technical advantage is to integrate an extended cache coherency protocol with the transaction record of the processor. Embodiments of the present invention may include all, some, or none of these technical advantages while other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
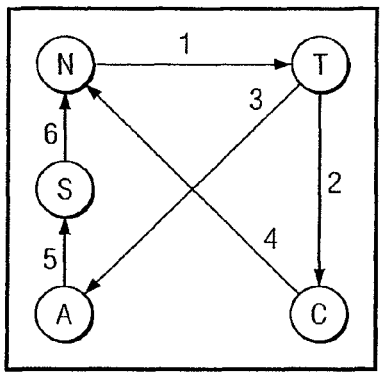
FIG. 1 illustrates a state diagram for a processor in a computing system.

FIG. 1 shows a state diagram of the transition states that are entered into by a processor during operation. The transition states include Normal, Transaction, Commit, Abort, and Suspended. The Normal state indicates that there is no active transaction to process. The Transaction state indicates that a transaction is in progress. The Commit state indicates that a transaction has successfully completed but the transaction is in the process of being cleaned. The Abort state indicates that a transaction has been aborted but the transaction is still in the process of being cleaned. The Suspended state indicates that a transaction has been aborted and cleaned but the processor has not executed a Commit or Abort instruction.

In order to support transactions, the processor provides support for tracking access to memory locations involved in a transaction and state information for recording the processor's transaction state. To track transaction states, each processor maintains a Transaction Record as well as a mechanism (such as a pointer to a free list) to obtain memory locations for storage of additional transaction state information. In addition, the primary data cache state field is expanded to include the states of Invalid (I), Shared (S), Exclusive (E), Dirty (D), Shared Transactional (ST), Exclusive Transactional (ET), and Dirty Transactional (DT). Each cache tag also includes two added bits, TV and TVE, to indicate that transaction data formerly resided in that line and has been evicted. The TV bit indicates that data was evicted from the ST state. The TVE bit indicates that data was evicted from the ET or DT state. These bits are persistent through changes to the tag but are cleared when the transaction state is cleaned up during the Abort or Commit states.

Figure 2:
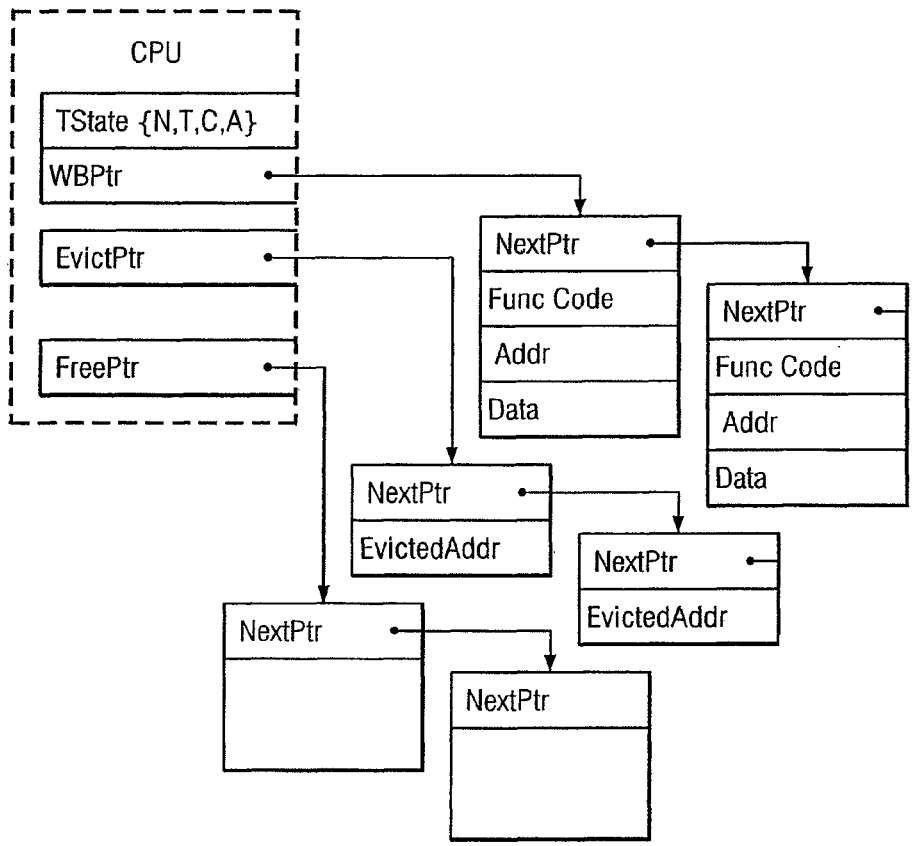
FIG. 2 illustrates the implementation of a transaction record maintained by the processor.

FIG. 2 shows the implementation of a Transaction Record maintained by the processor. The Transaction Record is a set of hardware registers in the processor storing the following fields: TState {Normal, Transaction, Commit, Abort, Suspended}, WBPtr {pointer to WBRrecord), and EvictPtr {pointer to evicted shared addresses}. Other information may be included to support additional functionality. When in the Normal state, the processor begins a transaction with the execution of any Transactional Memory Reference instruction (see following section for description of these instructions). This causes transition 1 in the state diagram of FIG. 1 and causes the processor to set the Transaction Record to the Transaction state. As long as the processor remains in the Normal state, it is not involved in a transaction and its actions obey the conventional coherency protocols.

Upon entering the Transaction state, the processor's behavior changes as it is now engaged in a transaction and, from that point until a successful Commit state, the processor will do nothing which will cause the state of memory visible to other processors in the system to change. The processor's cache is used to hold changes which it makes, and any data which is evicted from the primary data cache is copied into an eviction list instead of being sent back to its normal memory location. Upon executing a Commit state, all changes to memory performed during the transaction are made globally visible. If, instead, the transaction aborts, the locations in the cache containing changes made during the transaction and the evicted writebacks are discarded, restoring the state of memory (as viewed by all processors) to what it was at the beginning of the transaction.

While in the Transaction state, any transactional load instruction to a new address adds that address to the transaction's Read Set and any transactional load exclusive or transactional store instruction adds that address to the transaction's Write Set. Any attempt by another processor to write to an address in the Read Set, or to read or write from an address in the Write Set, will cause the current transaction to abort (transition 3 in the state diagram of FIG. 1). An abort will also be caused by any exception during the transaction or by the execution of an Abort instruction. Certain simple exceptions may be permitted, especially Transaction Lookaside Buffer (TLB) misses (if these are still handled in software) to occur without causing an abort. An ABORT instruction may be added at the beginning of the exception handlers instead of doing the abort in hardware.

While in Transaction state, the processor's response to incoming coherency (Invalidate, Update, and Intervention Requests) messages is modified as follows: Invalidate and Update requests are processed normally, except that if the primary cache line it targets has a TV or TVE bit set, the coherency address is also checked against all addresses in the Evicted or Writeback list, respectively. If both bits are set, both lists will be checked. If the coherency address matches any address in one of these lists, or if it hits a line in the ST, ET, or DT states, the transaction aborts (see below for details of the abort operation). Intervention requests that match the tag of a line in the DT state will be processed as if the line were in the ET state—the processor responds with a message indicating that the contents of memory should be used. If the TVE bit for the line is set, the Intervention address is also checked against the Writeback list. If the Intervention address matches a tag or a list address, the transaction aborts.

Other than an abort, the only other way to exit the Transaction state is the execution of a Commit instruction, which causes the transaction state machine to go to the Commit state (transition 2 in the state diagram of FIG. 1). Upon execution of a COMMIT instruction while in Transaction state, the processor enters the Commit state. In this state, all changes to memory performed during the committed transaction are made visible to the rest of the system. To accomplish this, the following actions are performed:

The Evicted Address list is discarded and the tokens in the list are attached to the end of the free list. The Evict Pointer is set to null.

All writebacks stored in the Writeback list are converted to WBack messages and written to their home node. All tokens in the Writeback list are attached to the end of the free list. The Writeback Pointer is set to null. The L2 cache is invalidated at the address of the writeback if that address is currently stored in the L2 cache.

All TV and TVE bits in the primary cache are set to zero.

All cache lines in the ST state transition to the S state. All cache lines in the ET state transition to the E state. All cache lines in the DT state transition to the D state.

Upon completion of the above actions, the processor transitions to the Normal state (transition 4 in the state diagram of FIG. 1).

While in the Commit state, incoming Intervention, Invalidate, and Update requests are held until the processor exits this state. It may be feasible to handle these requests in this state as a performance optimization by taking the actions needed to produce the same result as would occur after the Commit state is complete. Any transactional memory reference instruction that is issued stalls until the processor exits the Commit state. Commit and Abort instructions are treated as no operation instructions (NOPs) if executed when the processor is not in the Transaction state. In some implementations, these instructions trap if an attempt is made to execute them when already in the Commit state.

When in the Transaction state, the following situations will cause a transition to the Abort state (transition 3 in the state diagram of FIG. 1), aborting the current transaction:

Execution of an Abort instruction.

The processor takes an exception.

An Invalidate or Update Request is received whose address matches any cache line that is part of the Read Set.

An Intervention is received whose address matches any cacheline that is part of the Write Set.

Upon execution of an abort instruction, the processor enters the Abort state. In this state, all changes to memory performed during the aborted transaction are discarded, restoring the state of the contents of the Write Set to its state prior to the start of the transaction. To accomplish this, the following actions are performed:

Eliminate messages may be sent to the directory for all addresses in the Evicted Address list (this is a performance optimization which is optional). The Evicted Address list is discarded and the tokens in the list are attached to the end of the free list. The Evict Pointer is set to null.

Eliminate messages may be sent to the directory for all addresses in the Writeback list (this is a performance optimization which is optional). All writebacks stored in the Writeback list are discarded. All tokens in the Writeback list are attached to the end of the free list. The Writeback Pointer is set to null. The L2 cache is invalidated at the address of the writeback if that address is currently stored in the L2 cache.

All TV and TVE bits in the primary cache are set to zero. All cache lines in the ST state transition to the S state. All cache lines in the ET state transition to the E state. All cache lines in The DT state transition to the I state. Eliminate messages may be sent to the directory for all cache lines transitioned to the I state.

Upon completion of the above actions, the processor transitions to the Suspended state (transition 5 in the state diagram of FIG. 1) until a Commit instruction is executed (Commit instructions will stall if dispatched while in the Abort state and execute as soon as the transition to the Suspend state occurs).

While in the Abort state, incoming Intervention, Invalidate, and Update requests are held until the processor exits this state. It may be feasible to handle these requests in this state as a performance optimization by taking the actions needed to produce the same result as would occur after the abort instruction is complete. Any transactional memory reference instruction that is issued stalls until the processor exits the Abort state.

The processor enters the Suspended state as soon as it completes the cleanup of the aborted transaction in the Abort state. While in the Suspended state, the processor executes as in the Normal state except that all transactional memory reference instructions are treated as NOPs. Upon executing a Commit instruction, the processor transitions to the Normal state, making it ready to begin another transaction.

The following new processor instructions are added:

TEST_T (R)—Sets register R to a non-zero Reason Code (reason codes to be defined) if the processor is currently in the Abort or Suspended states; sets R to zero otherwise. This instruction is used to test to see whether the current transaction has been aborted to allow skipping the execution of useless instructions.

ABORT—Aborts the current transaction—If the processor is in the Transaction state, sets the Transaction State to the Abort state thereby initiating the actions described above. If the current transaction has already aborted, or the processor is in any state other than the Transaction state, this instruction acts as a NOP.

COMMIT (R)—Attempts to commit the current transaction—If the processor is in the Transaction state, sets the Transaction state to the Commit state, performing the commit of the current transaction, as described above. If the current transaction has already aborted (the processor being in the Suspended state), the COMMIT instruction causes a transition to the Normal state. If the current state is the Abort state, the COMMIT instruction stalls until transaction cleanup completes and the processor transitions to the Normal state. Register R is set to a non-zero Reason Code (reason codes to be defined) if the processor is currently in the Abort or Suspended states; R is set to zero otherwise. If executed while in the Normal or Commit states, a COMMIT instruction acts as a NOP or may cause an exception.

For the following group of Transactional Memory Reference instructions, if the processor's state is Normal, executing these sets the processor state to Transaction. These instructions may be in single and double word, integer, and floating point forms.

LT (Load Transactional)—Performs a Load for read access only and adds the referenced memory location to the Read Set of the current transaction. This instruction acts exactly like an ordinary Load instruction, except that it sets the cache state to the ST state instead of the S state. If the cache is already in the S or E state, it transitions to ST; if already in the D state it performs an ordinary Writeback with Data Retained and transitions to ST. If the cache is already in any *T state, the state remains unchanged.

LTX (Load Transactional Exclusive)—Performs a Load for write access and adds the referenced memory location to the Write Set of the current transaction. This instruction acts exactly like an ordinary Load instruction, except that it issues a read exclusive request to the directory and sets the cache state to the ET state instead of the S state. If the cache is already in the S, ST, or E states, it sends an Upgrade request to the directory and transitions to ET; if already in the D state it performs an ordinary Writeback with Data Retained and transitions to the ET state. If the cache is already in ET or DT state, the state remains unchanged. This instruction may replace a LL instruction.

STX (Store Transactional)—Performs a Store and adds the referenced memory location to the Write Set of the current transaction. This instruction acts exactly like an ordinary Store instruction, except that it sets the cache state to the DT state instead of the D state. If the cache is already in the S, ST, or E states, it sends an Upgrade request to the directory and transitions to the DT state; if already in the D state it performs an ordinary Writeback with data retained and transitions to the DT state; if already in the ET state, the cache transitions to the DT state. If the cache is already in the DT state, the state remains unchanged.

Figure 3:
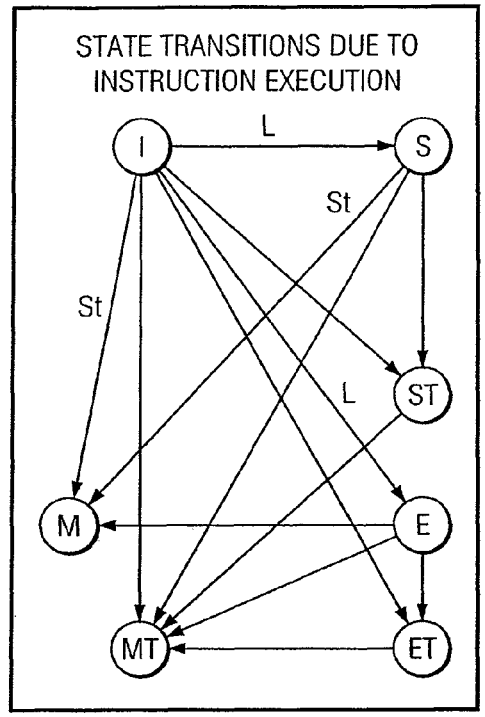
FIG. 3 illustrates the cache coherency state transitions due to instruction execution.

FIG. 3 shows the cache state transitions due to instruction execution. The following shows the system behavior for the various cache states under the extended coherency model needed to support the functions described above.

Invalid (I)—Cache line is not in use and contains no valid data. The directory may be in any state.

Shared (S)—Cache line contains a copy of data which is the same as the contents of memory and the contents of other caches also in S or ST states. The directory will be in the S state and its sharing vector will point at this node.

Shared Transactional (ST)—Cache line contains a copy of data that is the same as the contents of memory (and the same as the contents of other caches also in the S or ST states). The collection of all cache lines in the ST state plus all of the cache lines in the Eviction List constitutes the Read Set of a transaction. The directory will be in the S state and its sharing vector will point at this node. When a cache line is in the ST state and the processor is in the Transaction state, an eviction of the line from the processor's cache will cause the evicted address to be added to the Eviction List and the TV bit for that cache tag to be set.

Exclusive (E)—Cache line contains a copy of data that is the same as the contents of memory. No other cache in the system contains a copy of this data and the processor may write to this line without performing any coherency transactions. The directory will be in the E state and its pointer will point at this node.

Exclusive Transactional (ET)—Cache line contains a copy of data that is the same as the contents of memory. No other cache in the system contains a copy of this data and the processor may write to this line without performing any coherency transactions. The directory will be in the E state and its pointer will point at this node. When a cache line is in the ET state and the processor is in the Transaction state, an eviction of the line from the processor's cache will cause the evicted address to be added to the Writeback List and the TVE bit for that cache tag to be set.

Dirty (D)—Cache line contains modified data that is different from the contents of memory. No other cache in the system contains a copy of this data and the processor may write to this line without performing any coherency transactions. The directory will be in the E state and its pointer will point at this node.

Dirty Transactional (DT)—Cache line contains modified data that is different from the contents of memory. The directory will be in the E state and its pointer will point at this node. When a cache line is in DT state and the processor is in the Transaction state, an eviction of the line from the processor's cache will cause the evicted address and data to be added to the Writeback List and the TVE bit for that cache tag to be set.

In summary, the state of the processor during memory transactions is maintained in a transaction record of the processor. The coherency protocol for the cache lines is extended to include additional states. By providing support for memory transactions along with an expanded cache state implementation, an improved cache coherency protocol is achieved. The processing discussed above may be incorporated entirely in computer software code, on a computer readable medium, or be incorporated into a combine software/hardware implementation.

One of the advantages provided by the present invention is that the cache coherency protocol does not need to be changed. Moreover, the directory structures are unchanged on the memory modules. Another important advantage is that the footprint of a transaction is not limited by the size of the cache within a processor module. A sequence of instructions can be treated as a single transaction that is either atomically executed with respect to other sequences of instructions or is not executed. The number of distinct memory locations referenced by an instruction sequence as a single transaction, in a system having a processor module with a processor and a cache, is not limited by the size of the cache.

Thus, it is apparent that there has been provided, in accordance with the present invention, a system and method for performing memory operations in a computing system that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims. Moreover, the present invention is not intended to be limited in any way by any statement made herein that is not otherwise reflected in the appended claims.

What is claimed is:

1. A method for performing memory operations in a computing system, comprising:

transitioning a cache line associated with a memory location from a conventional MESI coherency protocol to one of a plurality of transactional coherency states associated with a Transaction operating state of a processor;

performing updates to the cache line associated with the memory location, the updates to the cache line not being visible to other processors in the computing system;

identifying the cache line with a transaction coherency state according to the update performed.

2. The method of claim 1, further comprising:

receiving a commit instruction;

transitioning to a Commit operating state;

making any changes to the cache line visible to other processors in the computing system.

3. The method of claim 2, further comprising:

transitioning the cache line from one of the plurality of transactional states to the conventional MESI protocol;

transitioning to a Normal operating state upon making changes to the cache line visible to other processors and performing the cache line transition.

4. The method of claim 1, further comprising:

receiving an event causing an abort of the cache line update;

transitioning to an Abort operating state in response to the event.

5. The method of claim 4, further comprising:

discarding any changes made to the cache line;

transitioning the cache line associated with the memory location from one of a plurality of transactional coherency states associated with the Transaction operating state to the conventional MESI coherency protocol.

6. The method of claim 5, further comprising:

transitioning to a Suspended operating state upon completion of the discarding of any changes to the cache line.

7. The method of claim 1, further comprising:

processing MESI coherency protocol messages received from other processors.

8. The method of claim 1, further comprising:

tracking a state of the processor and operations performed on the cache line.

9. A computer readable storage medium including code for performing memory operations in a computing system, the code operable to:

transition a cache line associated with a memory location from a conventional MESI coherency protocol to one of a plurality of transactional coherency states associated with a Transaction operating state of a processor;

perform updates to the cache line associated with the memory location, the updates to the cache line not being visible to other processors in the computing system;

identify the cache line with a transaction coherency state according to the update performed.

10. The computer readable medium of claim 9, wherein the code is further operable to:

receive a commit instruction;

transition to a Commit operating state;

make any changes to the cache line visible to other processors in the computing system.

11. The computer readable medium of claim 10, wherein the code is further operable to:

transition the cache line from one of the plurality of transactional states to the conventional MESI protocol;

transition to a Normal operating state upon making changes to the cache line visible to other processors and performing the cache line transition.

12. The computer readable medium of claim 9, wherein the code is further operable to:
  receive an event causing an abort of the cache line update;
  transition to an Abort operating state in response to the event.

13. The computer readable medium of claim 12, wherein the code is further operable to:
  discard any changes made to the cache line;
  transition the cache line associated with the memory location from one of a plurality of transactional coherency states associated with the Transaction operating state to the conventional MESI coherency protocol.

14. The computer readable medium of claim 9, wherein the code is further operable to:
  process MESI coherency protocol messages received from other processors.

15. The computer readable medium of claim 14, wherein processing of MESI coherency protocol messages causes updates to the cache line to be aborted.

16. A system for performing memory operations in a computing system, comprising:
  means for transitioning a cache line associated with a memory location from a conventional MESI coherency protocol to one of a plurality of transactional coherency states associated with a Transaction operating state of a processor;
  means for performing updates to the cache line associated with the memory location, the updates to the cache line not being visible to other processors in the computing system;
  means for identifying the cache line with a transaction coherency state according to the update performed.

17. The system of claim 16, further comprising:
  means for transitioning to a Commit operating state;
  means for making any changes to the cache line visible to other processors in the computing system.

18. The system of claim 17, further comprising:
  means for transitioning the cache line from one of the plurality of transactional states to the conventional MESI protocol;
  means for transitioning to a Normal operating state upon making changes to the cache line visible to other processors and performing the cache line transition.

19. The system of claim 16, further comprising:
  means for receiving an event causing an abort of the cache line update;
  means for transitioning to an Abort operating state in response to the event.

20. The system of claim 19, further comprising:
  means for discarding any changes made to the cache line;
  means for transitioning the cache line associated with the memory location from one of a plurality of transactional coherency states associated with the Transaction operating state to the conventional MESI coherency protocol.

21. The computer readable medium of claim 16, wherein the code is further operable to:
  process MESI coherency protocol messages received from other processors.

22. The computer readable medium of claim 21, wherein processing of MESI coherency protocol messages causes updates to the cache line to be aborted.

* * * * *